(12) United States Patent
Jones et al.

(10) Patent No.: US 7,831,588 B2
(45) Date of Patent: Nov. 9, 2010

(54) CONTEXT-SENSITIVE QUERY EXPANSION

(75) Inventors: Rosie Jones, Pasadena, CA (US);
Desislava Petkova, Amherst, MA (US)

(73) Assignee: Yahoo! Inc., Sunnyvale, CA (US)

(*) Notice: Subject to any disclaimer, the term of this patent is extended or adjusted under 35 U.S.C. 154(b) by 505 days.

(21) Appl. No.: 12/026,053

(22) Filed: Feb. 5, 2008

(65) Prior Publication Data
US 2009/0198672 A1    Aug. 6, 2009

(51) Int. Cl.
G06F 17/30 (2006.01)
G06F 7/00 (2006.01)

(52) U.S. Cl. .................................. 707/713; 707/748

(58) Field of Classification Search ............. 707/713, 707/748, 999.5
See application file for complete search history.

(56) References Cited

U.S. PATENT DOCUMENTS

| | | | | |
|---|---|---|---|---|
| 5,265,065 A * | 11/1993 | Turtle | | 1/1 |
| 5,418,948 A * | 5/1995 | Turtle | | 707/700 |
| 5,488,725 A * | 1/1996 | Turtle et al. | | 1/1 |
| 5,826,260 A * | 10/1998 | Byrd et al. | | 1/1 |
| 5,963,940 A * | 10/1999 | Liddy et al. | | 1/1 |
| 6,985,904 B1 * | 1/2006 | Kaluskar et al. | | 1/1 |
| 7,051,023 B2 * | 5/2006 | Kapur et al. | | 707/690 |
| 7,260,571 B2 * | 8/2007 | Amitay et al. | | 1/1 |
| 7,644,047 B2 * | 1/2010 | Assadian et al. | | 706/1 |
| 7,747,593 B2 * | 6/2010 | Patterson et al. | | 707/705 |
| 2004/0098385 A1 * | 5/2004 | Mayfield et al. | | 707/3 |
| 2004/0199498 A1 | 10/2004 | Kapur | | |
| 2004/0236725 A1 * | 11/2004 | Amitay et al. | | 707/3 |
| 2005/0038781 A1 * | 2/2005 | Ferrari et al. | | 707/4 |
| 2005/0216478 A1 * | 9/2005 | Chipalkatti et al. | | 707/10 |
| 2007/0011154 A1 * | 1/2007 | Musgrove et al. | | 707/5 |
| 2007/0016571 A1 * | 1/2007 | Assadian et al. | | 707/5 |
| 2007/0038602 A1 * | 2/2007 | Weyand et al. | | 707/3 |
| 2007/0038621 A1 | 2/2007 | Weyand | | |

(Continued)

FOREIGN PATENT DOCUMENTS

WO    WO 2005/031600 A2 *    4/2005

(Continued)

OTHER PUBLICATIONS

Vechtomova, Olga, et al., "Query Expansion with Terms Selected Using Lexical Cohesion Analysis of Documents", Information Processing and Management, vol. 43, Issue 4, Jul. 2007, pp. 849-865.*

(Continued)

Primary Examiner—Robert Stevens
(74) Attorney, Agent, or Firm—Brinks Hofer Gilson & Lione (57) ABSTRACT

A method for processing a search query having a plurality of search terms for searching for documents includes segmenting the query to identify two or more units, expanding the query by selecting one or more substitutable units for at least one unit in the query, and calculating a substitution probability for each substitutable unit. For each substitutable unit, a co-occurrence probability is calculated with each of the remaining units in the search query. An occurrence probability is then calculated for each substitutable unit, and a score is calculated based on the combination of the substitution probability, the co-occurrence probability, and occurrence probability. The documents are ranked in an order determined by the score.

29 Claims, 5 Drawing Sheets

U.S. PATENT DOCUMENTS

2007/0043755 A1* 2/2007 Rolleke ............... 707/102
2007/0174267 A1* 7/2007 Patterson et al. ........... 707/5
2007/0203894 A1    8/2007 Jones

FOREIGN PATENT DOCUMENTS

WO    WO 2005/041063 A1 *  5/2005

OTHER PUBLICATIONS

Jones, K. Sparck, et al., "A Probabilistic Model of Information Retrieval: Development and Comparative Experiments—Part 2", Information Processing and Management, vol. 36, © 2000, pp. 809-840.*

Song, Fei, et al., "A General Language Model for Information Retrieval", CIKM '99, Kansas City, MO, © 1999, pp. 316-321.*

Bhogal, J., et al., "A Review of Ontology Based Query Expansion", Information Processing and Management, vol. 43, Issue 4, Jul. 2007, pp. 866-886.*

Bruza, P. D., et al., "Query ReFormation on the Internet: Empirical Data and Hyperindex Search Engine", Proceedings of the RIAO 97 Conference, © 1997, pp. 488-499.*

Vechtomova, Olga, et al., "Report on the ACM international Workshop on Methodologies and Evaluation of Lexical Cohesion Techniques in Real-world Applications (ELECTRA 2005) held at SIGIR 2005", ACM SIGIR FORUM, vol. 39, No. 2, Dec. 2005, pp. 42-45.*

Lin, Shian-Hua, et al., "Extracting Classification Knowledge of Internet Documents with Mining Term Associations: A Semantic Approach", SIGIR '98, Melbourne, Australia, © 1998, pp. 241-249.*

Bruza, Peter, et al., "Interactive Internet Search: Keyword, Directory and Query Reformulation Mechanisms", SIGIR 2000, Athens, Greece, © 2000, pp. 280-287.*

Robertson, S. E., "On Term Selection for Query Expansion", Journal of Documentation, vol. 46, No. 4, Dec. 1990, pp. 359-364.*

Pickens, Jeremy, et al., "Term Context Models for Information Retrieval", CIKM '06, Arlington, VA, Nov. 5-11, 2006, pp. 559-566.*

Vechtomova, Olga, et al., "Query Expansion with Long-Span Collocates", Information Retrieval, vol. 6, © 2003, pp. 251-273.*

Qiu, Yonggang, et al., "Concept Based Query Expansion", ACM—SIGIR '93, Pittsburgh, PA, © 1993, pp. 160-169.*

Unity: Relevance Feedback using User Query Logs; Jignashu Parikh and Shyam Kapur; Aug. 6-11, 2006, pp. 689-690 Seattle, Washington, USA.

Generating Query Substitutions; Rosie Jones, Benjamin Rey and Omid Madani; WWW 2006, May 23-26, 2006, 10 Pages, Edinburgh, Scotland.

* cited by examiner

| Query Formulation | Complete Judgments ||
|---|---|---|
| | P@1 | P@3 |
| Original Query | 0.4062 | 0.3646 |
| Pseudo-relevance Feedback | 0.4167 | 0.3611 |
| Context-blind Query Rewriting | 0.5000 | 0.3924 |
| Context-sensitive Query Rewriting | 0.5208 | 0.4028 |

CONTEXT-SENSITIVE QUERY EXPANSION

TECHNICAL FIELD

The present invention relates to a system and method for identifying one or more queries and/or documents that are related to a given query.

BACKGROUND

The World Wide Web is a distributed database having billions of data records accessible through the Internet. Search engines are commonly used to search the information available on computer networks, such as the World Wide Web, to enable users to locate data records of interest. Web pages, hypertext documents, and other data records from various sources, accessible via the Internet or other networks, are typically collected by a crawler. Crawlers may collect data records from the sources using various methods and algorithms. For example, a crawler may follow hyperlinks in a collected hypertext document to collect other data records. The data records retrieved by the crawlers are stored in a database or a plurality of databases.

The data records are typically indexed by an indexer, which builds a searchable index of the documents in the database. Known methods for indexing the database may include inverted files, vector spaces, suffix structures, and hybrids thereof. For example, each web page may be broken down into words and respective locations of each word on the page. The pages are then indexed by the words and their respective locations. A primary index of the entire database may be broken down into a plurality of sub-indices, and each sub-index is sent to a search node.

To use the search engine, a user typically enters one or more search terms or keywords, which are sent to a dispatcher. The dispatcher compiles a list of search nodes in a cluster to execute the query, and forwards the query to those selected search nodes. The search nodes search respective parts of the primary index and return sorted search results along with a document identifier. The dispatcher merges the received results to produce a final result set displayed to the user, which is usually sorted by relevance scores.

The relevance score is a function of the query itself and the type of document produced. Factors that affect the relevance score may include: a) a static relevance score for the document, such as link cardinality and page quality; b) placement of the search terms in the document, such as titles, metadata, and document web address; c) document rank, such as a number of external data records referring to the document and the "level" of the data records; and d) document statistics, such as query term frequency in the document, global term frequency, and term distances within the document. For example, "term frequency inverse document frequency" (TFIDF) is a statistical technique that is suitable for evaluating how important a word is to a document. The importance increases proportionally to the number of times a word appears in the retrieved documents, but is offset by how common the word is in all of the documents in the collection of documents, referred to as the "corpus."

Some known searching processes expand or rewrite the query to include other terms. However, known expansion processes may include erroneous expanded terms if the original query contains spelling errors or if there is vocabulary mismatch between the query and the document collection, which results in the retrieval of non-relevant documents. Other processes return erroneous expansion results if the initial returned documents are not the most relevant.

BRIEF SUMMARY

In one aspect, a method for processing a search query having a plurality of search terms for searching for documents includes segmenting the query to identify two or more units, expanding the query by selecting one or more substitutable units for at least one unit in the query, and calculating a substitution probability for each substitutable unit. For each substitutable unit, a co-occurrence probability is calculated with each of the remaining units in the search query. An occurrence probability is then calculated for each substitutable unit, and a score is calculated based on the combination of the substitution probability, the co-occurrence probability, and occurrence probability. The documents are ranked in an order determined by the score.

In another aspect, a method for processing a search query having a plurality of search terms for searching for documents includes expanding the query by selecting one or more substitutable terms for at least one term in the query, and calculating a substitution probability for each substitutable term. For each substitutable term, a co-occurrence probability is calculated with each of the remaining terms in the search query. An occurrence probability is then calculated for each substitutable term, and a score is calculated based on the combination of the substitution probability, the co-occurrence probability, and occurrence probability. The documents are ranked in an order determined by the score.

In a further aspect, a computer-readable storage medium having processor executable instructions to process a search query having a plurality of search terms for searching for documents includes segmenting the query to identify two or more units, expanding the query by selecting one or more substitutable units for at least one unit in the query, and calculating a substitution probability for each substitutable unit. For each substitutable unit, a co-occurrence probability is calculated with each of the remaining units in the search query. An occurrence probability is then calculated for each substitutable unit, and a score is calculated based on the combination of the substitution probability, the co-occurrence probability, and occurrence probability. The documents are ranked in an order determined by the score.

In yet another aspect, a system for processing a search query having a plurality of search terms for searching for documents includes a search engine configured to receive the queries and provide search results based on the queries, and a processor in communication with the search engine and configured to process the search query. The processor is further configured to segment the query to identify two or more units, expand the query by selecting one or more substitutable units for at least one unit in the query, and calculate a substitution probability for each substitutable unit. For each substitutable unit, the processor calculates a co-occurrence probability with each of the remaining units in the search query, and determines an occurrence probability for each substitutable unit. The processor calculates a score based on the combination of the substitution probability, the co-occurrence probability, and occurrence probability, and ranks the documents in an order determined by the score.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

Figure 1:
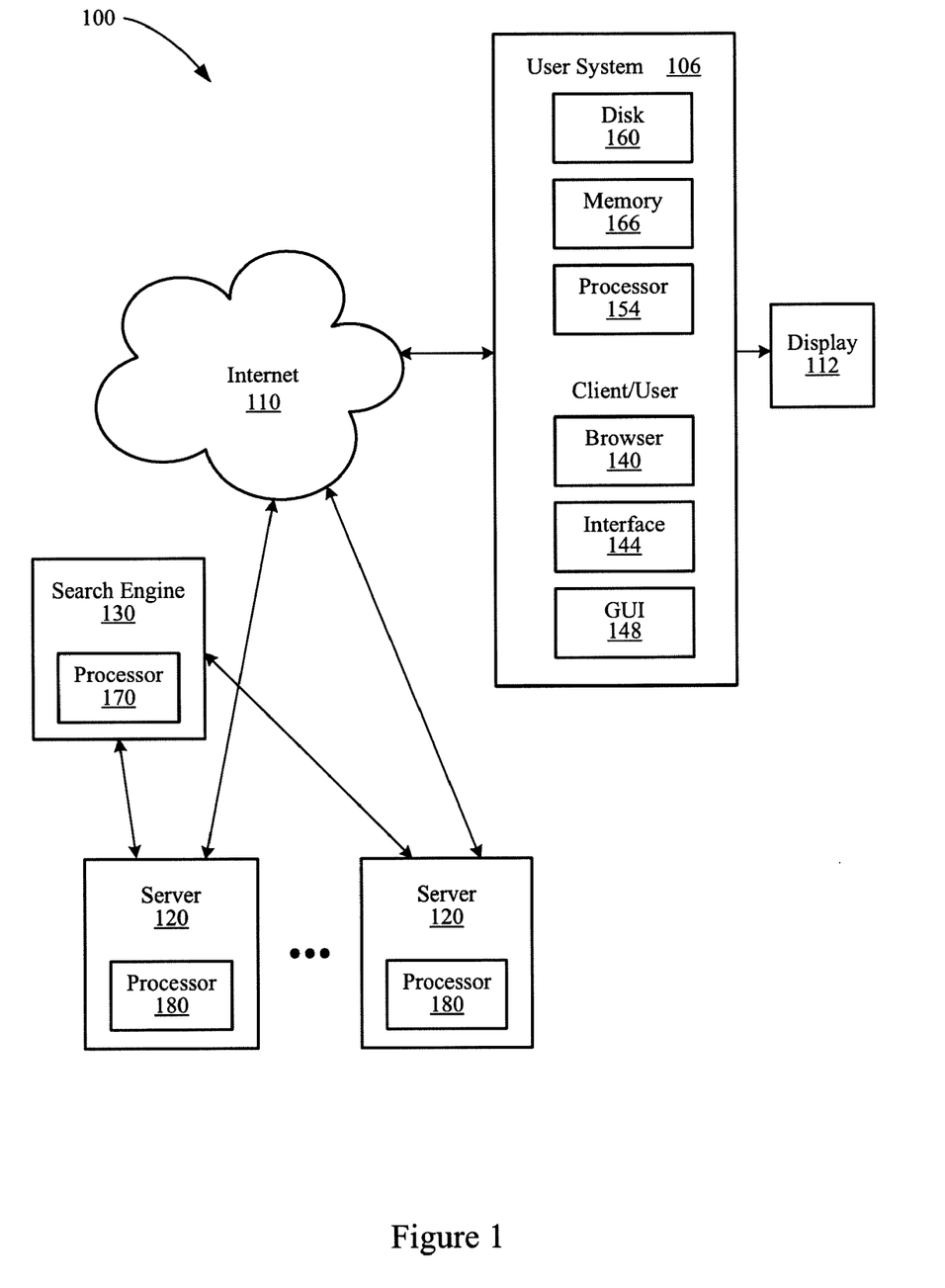
FIG. 1 is a pictorial diagram of one embodiment of an information retrieval system.

FIG. 1 illustrates a general overview of an information retrieval and communication network 100, including a client or user system 106. The client system 106 may be coupled through the Internet 110, or other communication network, e.g., over any LAN or WAN connection, to one or more server systems 120. The client system 106 may communicate with any of server systems 120 to access, receive, retrieve and display media content and other information, such as web pages, query log results (questions and answers), and the like. A user may send a query to a search engine 130, and the search engine or other system may process and respond to the query.

Some elements in the user system 106 may include conventional elements that need not be explained in detail herein. For example, the client system 106 may be a desktop personal computer, a workstation, a laptop, a PDA, a cell phone, a WAP-enabled device, or any computing device capable of interfacing directly or indirectly to the Internet. The client system 106 may run an HTTP client 140 (a browsing program), such as Microsoft Internet Explorer™, Netscape Navigator™, Mozilla™, or any suitable browser that permits a user of the client system to access, process and view information and pages available to it from server systems.

The client system 106 may include one or more user interface devices 144, such as a keyboard, a mouse, touchscreen, pen or the like, for interacting with a graphical user interface (GUI) 148 provided by the browser on a display 152. Although the systems and processes described are suitable for use with the Internet 110, other networks can be used instead of or in addition to the Internet, such as an intranet, an extranet, a virtual private network (VPN), a non-TCP/IP based network, or any LAN or WAN or the like.

The client system 106 and its components may be configurable using an application, including computer code executed by a central processing unit or processor 154, such as an Intel Pentium™ processor, AMD Athlon™ processor, or other suitable processor or processors. Computer code for operating and configuring the client system to communicate, process and display data and media content may be downloaded and stored on a hard disk 160. The program code or portions thereof may also be stored in any other volatile or non-volatile memory medium 166, such as a ROM or RAM, or provided on any media capable of storing program code, such as a compact disk (CD) medium, a digital versatile disk (DVD) medium, a floppy disk, and the like.

The search engine may include one or more processors 170 and/or the servers may include one or more processors 180. The processors 170 may be located in the search engine 130 or may be separate from the search engine, either logically or physically. Similarly, the processors 180 may be located in the servers 120 or may be separate from the servers, either logically or physically. Any suitable processor may be used with the search engine 130 and the servers 120, such as the processors 154 associated with the client system 106.

The user may submit queries to the search engine through various interfaces. For example, the user may enter a string into a query search box provided by Yahoo! The search engine 130 may receive queries through other interfaces, such as Yahoo! Answers, which provides a "community approach" that permits users to interact with other users to provide related questions and answers. The user may search for existing questions and corresponding answers provided by other users. Regardless of the source of the user query or interface used, the search engine 130 may provide results to the user that are tailored to be relevant to the user's query.

The "results," or what is retrieved by the search engine, may be in form of documents, links, or web pages. The "results" may generally be referred to as a "document," but may not necessarily relate to an actual "image" of a document, such as a pdf or html-type document. For example, when using Yahoo! Answers, the results or the "documents" provided may be a set of related questions and answers submitted by another user and saved in a query log or other storage. In some applications, the results may be a list of links to web pages containing the documents, or additional links. Thus, the term "document" is used loosely herein to refer to any result obtained by the search engine.

The system and method for context-sensitive query expansion may be particularly applicable to providing "documents" in the form of related questions and answers, as discussed above with respect to Yahoo! Answers, because such documents retrieved in Yahoo! Answers, for example, tend to be relatively short and contain limited context. However, the system and method for context-sensitive query expansion may also be used in web query search applications where the user simply enters a search string into a main page dialog box, such as the dialog box provided by Yahoo! at Yahoo.com.

Figure 2:
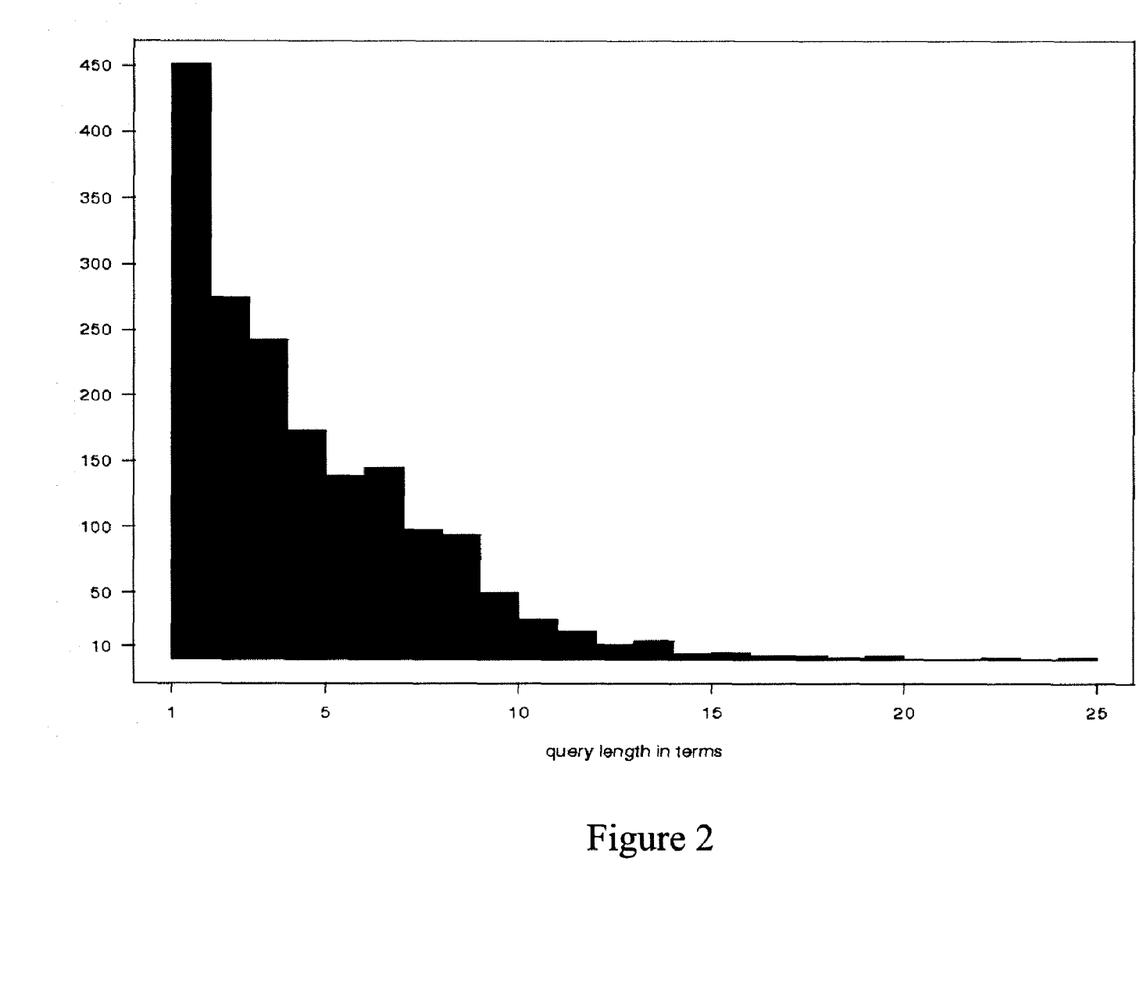
FIG. 2 is a graph showing query length statistics.

FIG. 2 illustrates query length distribution statistics based on the number of discrete words (X-axis) in the query. The relative frequency of queries of a given length is shown on the Y-axis. Because the queries tend to be relatively short in the context of the Yahoo! Answers interface, the relevancy of the documents returned by traditional searching methods tends to be low. Further, the documents returned using the Yahoo! Answers interface, for example, tend to be relatively short, because such "documents" are related questions and answer pairs, rather than web pages, pdf-type documents, "hard" documents, and the like. Accordingly, it may be difficult for known systems and processes to ascertain relevant context from such short documents.

The system and method for context-sensitive query expansion may use a form of query expansion or rewriting, which attempts to find other logically related and/or relevant terms, which could lead to retrieval of relevant documents and/or elimination of irrelevant documents. Any suitable query expansion or rewriting process may be used. Such a process is described in "System and Method For Determining Alternate Search Queries," Ser. No. 11/200,851 (now U.S. Pat. No. 7,634,462), filed Aug. 10, 2005, and is also described in "System and Method For Identifying Related Queries For Languages With Multiple Writing Systems," Ser. No. 11/365, 315 (now U.S. Pat. No. 7,689,554), filed Feb. 28, 2006, both of which are hereby incorporated herein by reference in their entirety.

With regard to query expansion, for example, $Q^o$ may represent the original or user query, while $Q^e$ may represent the expanded query. Two different exemplary expansions of an original query are shown below along with the original query:

$Q^o$="morse code sos"
$Q^e$="morse code sos help"
$Q^e$="morse code sos help signal"

The terms "help" and "signal" have been added by the query expansion process. Query expansion may use one or more substitution tables, which may include large tables of substitutable terms corresponding to each indexed term in the database. The substitution tables may be updated periodically by the search engine, for example once per day or once per week, or any suitable timeframe. The terms obtained from the substitution table may be referred to as "substitutables."

Query expansion may be based on a "term frequency inverse document frequency" process (TFIDF), which assumes that relevant terms are those that occur frequently in the retrieved documents, but occur infrequently in the remainder of the corpus documents. To determine the relevancy of the expanded term "help" in the above example, if the documents retrieved, which contain the terms "morse code SOS," frequently contain the word "help," while the other documents in the corpus infrequently contain the word "help," it is likely that the expanded term "help" is relevant.

As another example, the user query may be as follows:

$Q^o$="I want to know how to write sos in morse code" and two "documents" retrieved may be as follows:

Doc 1: "how do you tap sos in morse code?"
Doc 2: "why is there an sos instead of a page number on pg. 155 of da vinci code?"

Note that the "documents" are not truly "documents" in the conventional sense, but rather, the retrieved results are two saved queries entered by other users and saved in a query log, where such other queries are presumed to be relevant to the user's present query. Also note that using known query expansion processes, the second document appears to be irrelevant even though it contains the terms "sos" and "code."

The following example includes an inadvertent spelling error ("moris" rather than "morse") in the user query. The documents shown may be retrieved using a conventional "likelihood-type" retrieval process, as is known. The user query may be as follows:

$Q^o$="moris code sos"

and the "documents" retrieved using the likelihood-type retrieval process (without query expansion) may be as follows:

Doc 1: "why is there an sos instead of a page number on pg. 155 of da vinci code?"
Doc 2: "how do you tap sos in morse code?"

Note that document 1, which is an irrelevant document, is ranked higher that document 2, which is relevant. Using query expansion, the original query may be expanded to include the additional terms "morse" and "signal," as follows:

$Q^e$="moris code sos morse signal" where the "documents" retrieved using the likelihood-type retrieval process may be as follows:

Doc 1: "how do you tap sos in morse code?"
Doc 2: "why is there an sos instead of a page number on pg. 155 of da vinci code?"

Because the original query was expanded, and the additional term "morse" and "signal" were deemed relevant, document 1 is now properly ranked higher than document 2.

Thus, query expansion may overcome the illustrated spelling error in a specific embodiment.

Vocabulary mismatch may also cause known expansion processes to return less than relevant documents. The user query may be as follows:

$Q^o$="moris code sos"

and the expanded query may be as follows:

$Q^e$="morse code sos help signal"

The documents retrieved using the likelihood-type retrieval process may be as follows:

Doc 1: "what is the morse signal for help?"
Doc 2: "how can I learn morse code:"

Note that the document 1, the highest ranked document, contains the term "morse signal" rather than "morse code," and further contains the term "help" rather than the term "sos." Thus, the known expansion process using the likelihood-type retrieval process may introduce a vocabulary mismatch.

Further, conventional query expansion processes may lead to "topic drift," which may contribute to the retrieval of irrelevant documents. For example, a user query may be as follows:

$Q^o$="moris code sos" where two "documents" retrieved using the likelihood-type retrieval process may be as follows:

Doc 1: "how do you tap sos in morse code?"
Doc 2: "I need help with morse code"

The above documents are properly ranked, and document 1 more closely aligns with the user's intent. However, the query may be expanded using conventional query expansion processes, as shown below:

$Q^o$="moris code sos morse help"

where the "documents" retrieved using the likelihood-type retrieval process may be as follows:

Doc 1: "I need help with morse code"
Doc 2: "how do you tap sos in morse code?"

In the above example, the documents are now incorrectly ranked when using known query expansion processes. This is due to topic drift when using convention query expansion. Topic drift may occur because the expanded terms, although relevant to the original query, they may have different meanings. That is, the term "help" may have a meaning very different from the term "sos," even though they may have some apparent relevance to each other.

Query expansion may generally function adequately with a relatively small corpus, where the average result over a large number of queries is good. When searching a large corpus, there is less emphasis on finding all possible documents and more emphasis on obtaining the best results (relevance) for the individual documents retrieved.

The user query may also be expanded using a pseudo-relevance feedback process. This assumes that the top ranked documents returned are the most relevant. Pseudo-relevance feedback process may be used, for example, with a query likelihood retrieval process, and the expanded terms are obtained from the top ranked documents retrieved. However, pseudo-relevance feedback process may fail if the initial document retrieval process returns irrelevant documents. For example, the initial user query may be as follows:

$Q^o$="morse code sos"

where the top "k" documents" retrieved may be as follows:

Doc 1: "how do you signal sos in morse code?"
Doc 2: "does anyone know morse code? please translate this: '. . . - - - . . .'"

Using a pseudo-relevance feedback process, the top "k" documents may be retrieved and are assumed to be relevant.

The initial query is then expanded by selecting "m" terms from the top "k" documents, which may result in the following expanded query:

$Q^e$="moris code sos signal translate"

where the below documents are retrieved based on the expanded query, as follows:

Doc 3: "what was the sos code before it was sos?"
Doc 4: "does anyone know the sos code for pokemon red rescue? i am stuck on floor 89 in purity dungeon"
Doc 5: "what does the emergency code sos signify?"
Doc 6: "sos in da vinci code?"
Doc 7: "sos! debugging this vb code"

The above expanded query may not yield satisfactory results because the initial retrieval, in particular document 2 in response to the initial query, was not particularly relevant, due to the term "translate."

The system and method for context-sensitive query expansion may convert or segment the words of the query into concept units or "units," which are logically related terms representing a concept. The query may be "rewritten" based on the units. For example, if the query includes the discrete words "New York," the two words may be grouped together as a single unit, <New York>, where the triangular brackets represent the unit boundary. To process the query or query log, the entire query may be converted into a sequence of units. In one embodiment, the segmenting process may require that the query include two or more units. Single unit queries may not be processed. Any suitable process for converting the query or query log into units may be used. Such a process is described in "Systems and Methods For Generating Concept Units From Search Queries," Ser. No. 10/713,576, filed Nov. 12, 2003 (now U.S. Pat. No. 7,051,023), which is hereby incorporated by reference in its entirety.

For example, the initial query may be as follows:

$Q^o$="morse code sos" and after unit processing the segmented query may appear as follows:

$Q^u$=<morse code>|<SOS> where the angled brackets represent individual units.

Each unit in the segmented query may then be expanded using various substitutables obtained during the query expansion processes described above. The query may be expanded as shown below:

$Q^e$="<morse code><sos><sos>"

where the term "sos" has been expanded to include the term "s o s."

Figure 3:
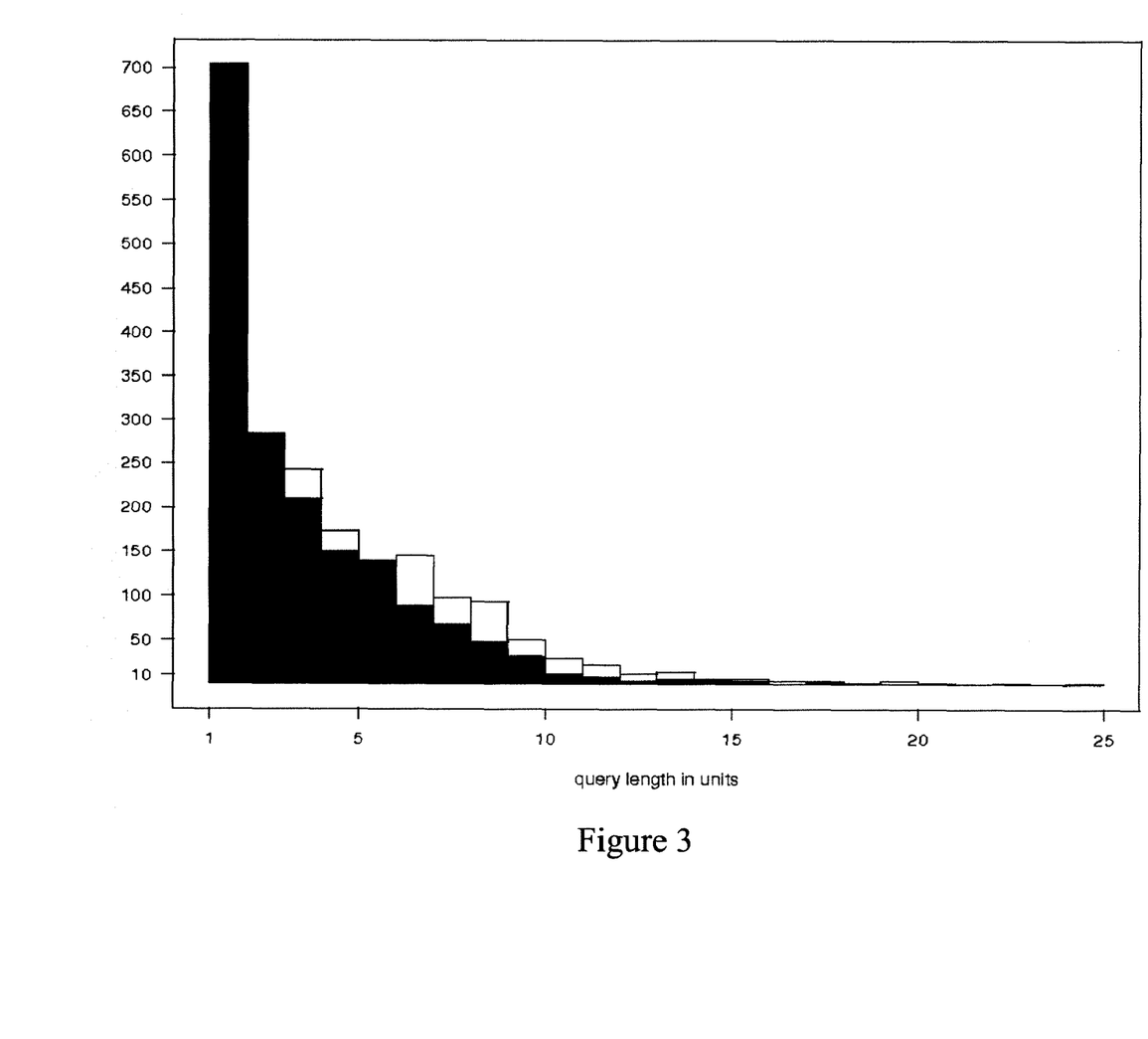
FIG. 3 is a graph showing query length statistics in query units.

FIG. 3 illustrates query length distribution statistics based on the number of units after the segmentation process has been applied. As illustrated, the segmentation process tends to "condense" the query. For example, about 700 queries are one unit in length after segmentation. This figure illustrates that most queries are segmented into more than a single unit, and thus each unit has some context. Thus, the majority of queries may receive benefit from the illustrated system and method.

The system and method for context-sensitive query expansion does not necessarily depend on the quality of the initial retrieval to obtain good results, as do some known processes. As described above, the results of expanding an initial query $Q^o$="moris code sos," using pseudo-relevance feedback may result in erroneous expansion terms such as $Q^e$="moris code sos fox time" due to the misspelling of the term "moris" (rather than "morse") in the initial query. This may occur because one of the prior queries (retrieved documents) in the query log may have appeared as follows, where initial retrieval information may have been obtained from the table of substitutables:

Q: On channel 24 on the Fox network, what did Moris say about where he got the code . . . when they're not doing time and they're not.?

Using the method for context-sensitive query expansion, the initial query may first be segmented and rewritten before expansion. However, mere segmentation and expansion without accounting for context may not yield satisfactory results. For example, an initial segmented query may be as follows:

$Q^o$="<moris code><sos>"

and the expanded query shown below may include the term "morse" due to the substitution process:

$Q^e$="<moris code><morse code><sos><s o s><rihanna sos><sos online>"

However, because the term "sos" is expanded with "s o s" (spaces between letters added) the additional terms "rihanna sos" and "sos online" may be erroneously added. This may occur using known expansion processes because one of the prior retrieved documents in the query search logs may have appeared as follows:

| BILLBOARD HOT 100 of 2006 | |
|---|---|
| 017. | Ne-Yo - So Sick |
| 018. | Yung Jock - It's Goin' Down |
| 019. | Rihanna - SOS (Rescue Me) |
| 020. | Panic! At The Disco - I Write Sins Not Tragedies |
| 021. | The All-American Rejects - Move Along |

In the above example, because the context was not considered, and because a recording artist named "Rihanna" happened to have an album named "Rihanna—SOS," the terms "rihanna" and "online" were erroneously added during expansion. Although the term "rihanna" does appear to be relevant to the term "sos" given the "Billboard" query above, it is not relevant in the context of "morse code" or even "moris code." Thus, as shown in the illustrated example, known context-blind segmentation and query expansion processes may not provide satisfactory retrieval results. Also, it may be assumed that there have been more queries directed to "Rhianna" and "sos" than to "morse code" and "sos."

The method for context-sensitive query expansion uses context of the query to govern expansion, and hence retrieval results. Let $u_i$ be a query unit, and let the context "$\bar{u}_i$" of the term $u_i$ be defined by Equation 1 below:

$$\bar{u}_i = \{u_j : u_j \in Q \land u_j \neq u_i\} \quad \text{(Eqn. 1)}$$

where the context of $u_i$ is the set of units $u_j$ such that $u_j$ is in the query Q, and the unit $u_j$ does not equal the unit $u_i$.

If "v" is a possible rewrite of $u_i$ using various substitutables, then the context of the query expansion is shown by Equation 2 below by applying Bayes' rule:

$$p(v | u_i, \bar{u}_i) = \frac{p(u_i, \bar{u}_i | v) p(v)}{p(u_i, \bar{u}_i)} \quad \text{(Eqn. 2)}$$

where the left side of the equation is the probability of the substitutable given the original unit and all of its context, which essentially represents how good the substitutable is. For example, the probability of the substitution may reflect how likely a user would interchange or "substitute" the term "baby" and "infant" in subsequent related queries. Thus, the substituted terms may be related in meaning. The right side of the equation represents the application of Bayes' rule to the probability of the substitutable.

Because the query unit, $u_i$, is fixed, the denominator of Equation 2 may be ignored, which is shown by Equation 3 below:

$$p(v|u_i, \overline{u_i}) = p(u_i, \overline{u_i}|v)p(v) \quad \text{(Eqn. 3)}$$

We may assume conditional independence between the query unit, "$u_i$" and its context "$\overline{u_i}$" as shown by Equation 4 below:

$$p(v|u_i, \overline{u_i}) = p(u_i|v)p(\overline{u_i}|v)p(v) \quad \text{(Eqn. 4)}$$

where the probability of original unit given the substitutable (more specifically, the unit given its rewrite), namely "$p(u_i|v)$," is referred to as the "substitution probability," which may have meaning analogous to the term "paraphrase" when dealing with statistical machine translation processes.

The probability of the substitutable query unit and all of its context given the substitutable, namely "$p(\overline{u_i}|v)$," is referred to as the "co-occurrence probability." The co-occurrence probability may relate to the likelihood that the two terms would co-exist in various queries or documents. For example, if an original query included the terms "baby" and "clothes," the issue may be whether the term "infant" can be substituted for the term "baby," that is, do users often use the terms "infant" and "clothes" together in documents. If so, the two terms are likely to be related, as defined by the co-occurrence probability. In other words, the co-occurrence probability relates building a language model or an estimate of how topically related the two units are.

Equation 4 may be rewritten assuming conditional independence of the substitutable query unit in context, as shown by Equation 5 below:

$$p(v|u_i, \overline{u}) = p(v|u_i)\left\{\prod_{u_j \in \overline{u_i}} p(u_j|v)\right\} p(v) \quad \text{(Eqn. 5)}$$

where the equation is separated into three "parts" for purposes of illustration only, namely:

Part A=$p(v|u_i)$=the substitution probability;

$$\text{Part } B = \left\{\prod_{u_j \in \overline{u_i}} p(u_j|v)\right\} = \text{the co-occurrence probability,}$$

and

Part C=$p(v)$=the occurrence probability of the substitutable or substitution term.

Part C, the probability of the substitutable or occurrence probability of the substitutable, relates to the probability of occurrence of the substitutable (not the substitution probability), in other words, the likelihood of finding the substitutable in the corpus. The substitution probability or occurrence probability of the substitutable may be calculated empirically. Each word or unit in the entire corpus may be indexed and assigned a frequency of occurrence. For example, if there are 10,000 documents in the corpus, and the word or unit "hotel" occurred in ten documents, then the occurrence probability of the substitutable term "hotel" is 10/10,000 or 0.001.

Thus, the probability of the substitutable given the original unit and all of its context "$p(v|u_i, \overline{u_i})$" may be represented based on the substitutable given the unit (Part A), multiplied by the product using all of the other context units, "$u_j$," given the substitutable (Part B), which is then multiplied by the occurrence probability of the substitutable (Part C). For purposes of computational efficiency, the substitution probability, the co-occurrence probability, and the occurrence probability may be pre-computed and stored in memory or tables.

As an example using Equation 5, consider a segmented query where a user is inquiring about the best hotels in New York, and we are considering expanding the term "best" with the term "cheapest," as follows:

$Q^0$=<best><new york><hotels> where the English language terms are substituted into Equation 5 to read as follows:

the probability of "cheapest" given the entire context $[p(v|u_i, \overline{u_i})]$ is equal to:

Part A, $p(v|u_i)$: the probability of "cheapest" given "best" multiplied by

Part B, $$\left\{\prod_{u_j \in \overline{u_i}} p(u_j|v)\right\}:$$

the probability of "new york" given "cheapest" multiplied by the probability of "hotels" given "cheapest" further multiplied by Part C, $p(v)$: the occurrence probability of "cheapest."

As another example of the method for context-sensitive query expansion, consider the following pictorial probability illustration using Equation 5, where the candidate expanded term "Rihanna" is shown as a picture of the artist, and the term "morse code" is shown as a picture of a machine.

The initial query is shown as follows:

$Q^o$="<moris code>|<SOS>"

and the expanded query is shown below:

$Q^e$="<moris code><morse code><sos><s o s><help><beep>"

The first probability expression below indicates that the probability of "Rihanna" given "SOS" is fairly high, which may be about a 71% probability. Thus, the initial impression is that "Rihanna" appears to be a good candidate expansion term or "rewrite" in the context of "sos." However, this is not the case because the term "Rihanna" has not yet been evaluated in its full content:

$p$(Rihanna|*SOS*)=fairly high probability.

The second probability expression below indicates that the probability of "morse code" given "Rihanna" is fairly low, which may be about a 10% probability:

$p$(morse code|Rihanna=fairly low probability.

The third probability expression below indicates that the probability of "Rihanna" given "SOS" and "morse code" is only low to medium, which may be about a 32% probability:

$p$(Rihanna|SOS, morse code)=low to medium probability.

Thus, when the candidate expansion term "Rihanna" is considered in the context of "sos" and "morse," such a candidate is likely to be rejected. In that regard, multiplying $p$(Rihanna|sos) by $p$(morse code|Rihanna), as shown by Part B of Equation 5, namely, $$\left\{\prod_{u_j \in u_i} p(u_j | v)\right\},$$

accounts for the candidate expansion in the context of the entire query, which permits a more informed evaluation of the candidate expansion term, and in the above example, permits the candidate expansion term to be rejected. Because the term "Rihanna" is not given a high weight (e.g., the document ranking may be adjusted), the terms "help" and "beep" are deemed to be better expansion candidates, as selected from the table of substitutables.

Figure 4:
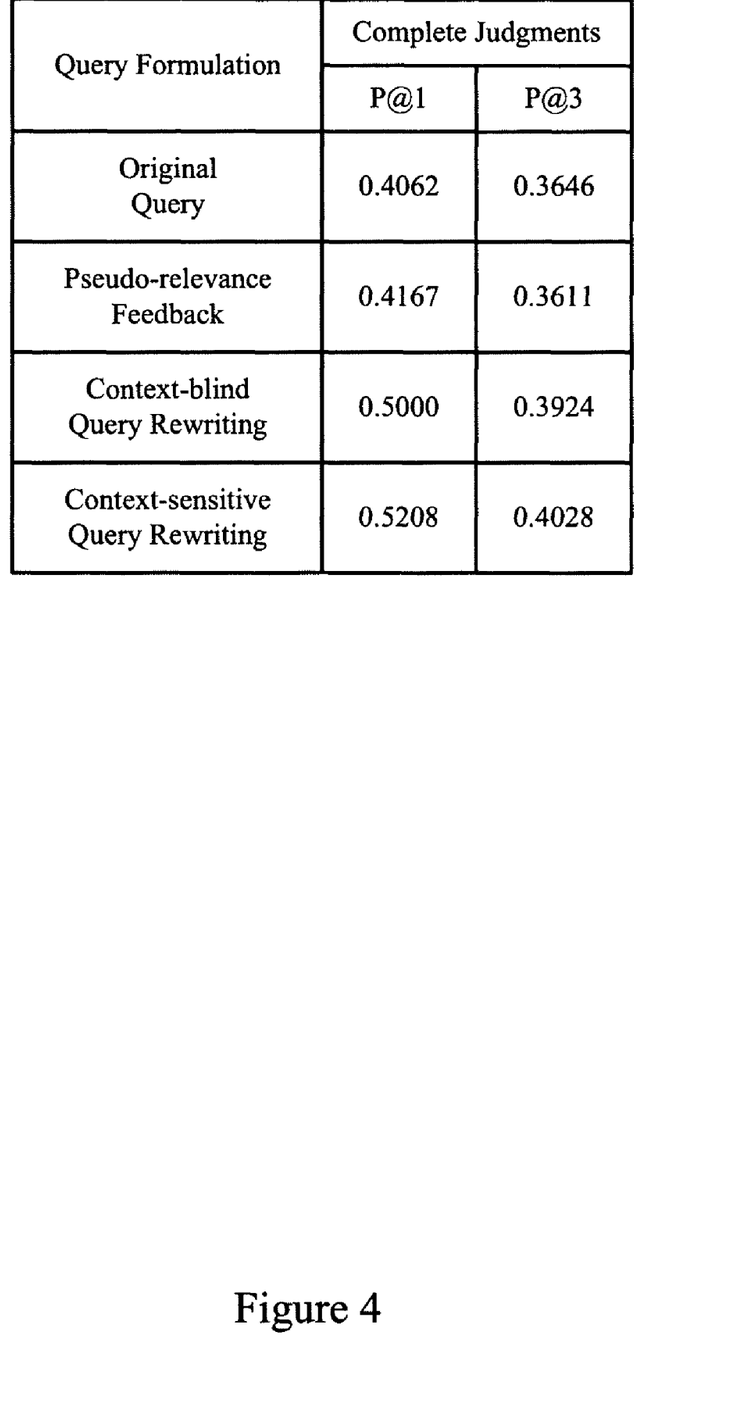
FIG. 4 is a chart comparing various query process results according to a specific embodiment.

FIG. 4 shows experimental results of various processes compared to the context-sensitive query expansion process. The results may be based on about one-hundred to about five-hundred queries. The first column indicates the type of query process performed. The second row contains data corresponding to an original or basic query process, which is essentially a "raw" query. The third row contains data corresponding to a pseudo-relevance feedback process. The fourth row contains data corresponding to a context-blind rewriting process (which ignores context and only uses substitution probabilities), and the fifth row contains data corresponding to the present method for context-sensitive query expansion.

The evaluation method used is "mean reciprocal rank," which indicates how far down the first relevant document is in a list of documents. In the illustrated experimental results, document relevance was evaluated by human auditors, who may make judgment calls regarding the document's relevance. The heading "P@1" or probability as rank 1, indicates how many documents were found at position no. 1, and the heading "P@3" indicates how many documents were found at position no. 3. As shown by row no. 5, the present method for context-sensitive query expansion provides superior results compared to the other illustrated methods for position no. 1 and position no. 3. Such superior results may include documents whose relevance are judged to be high, and an appropriate ranking of document relevance, as would be judged by the user or unbiased observer.

Figure 5:
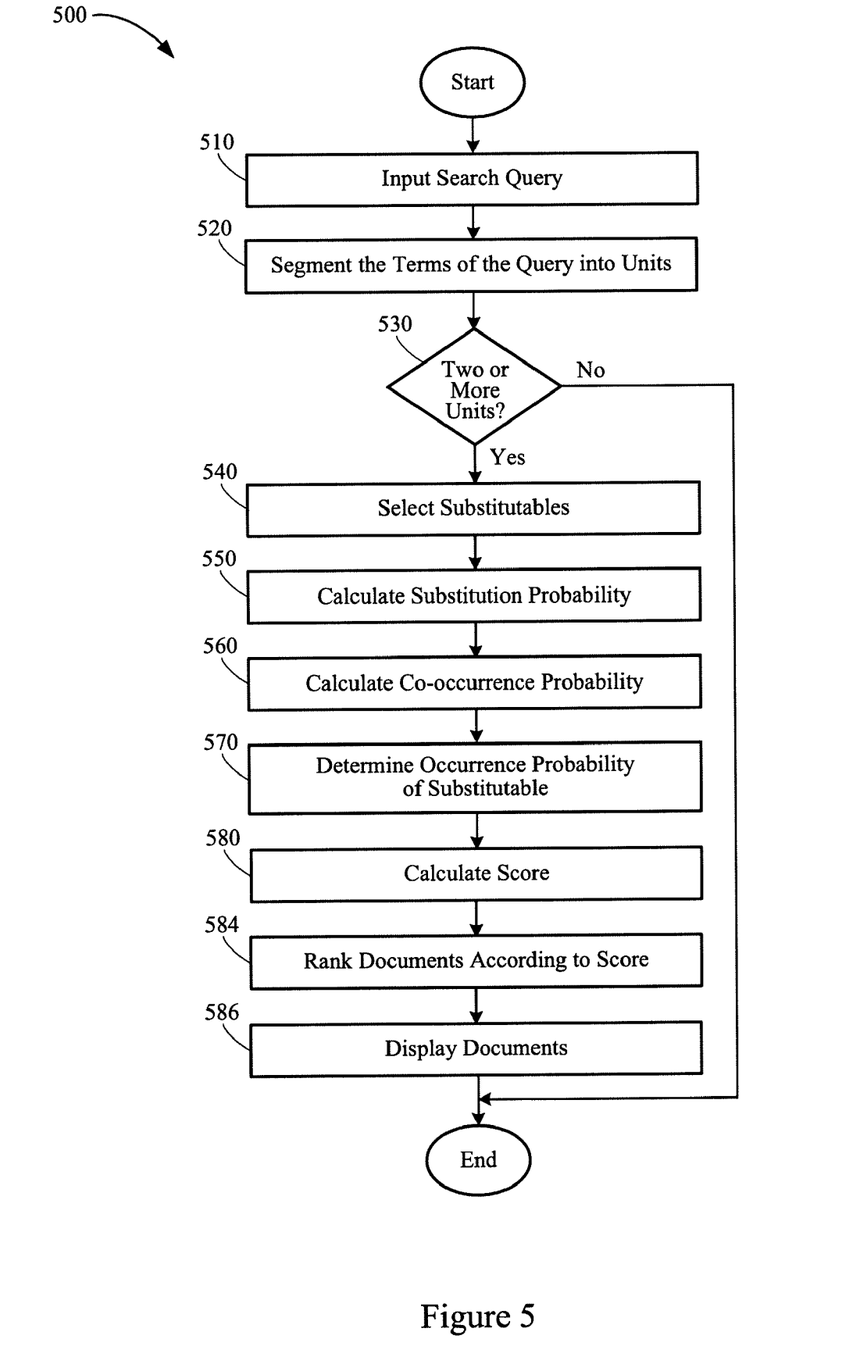
FIG. 5 is a flowchart according to one embodiment of a context-sensitive query expansion method.

FIG. 5 is a flowchart showing the acts taken (Act 500) in one embodiment of the context sensitive query expansion process. The search query is obtained and the search words or terms are identified (Act 510). The terms are then segmented into units (Act 520). If two or more units are identified (Act 530), meaning that the query has not been condensed to a single unit, one or more substitutable units are selected for at least one unit identified (Act 540). Not all of the units may have a corresponding substitutable, and some units may have more than one substitutable. A substitution probability is then calculated for each substitutable unit (Act 550). Next, for each substitutable unit, a co-occurrence probability with each of the remaining units in the search query is calculated (Act 560). Once the co-occurrence probability has been determined, the occurrence probability for each substitutable unit is calculated (Act 570). A score is then calculated based on the combination of the substitution probability, the co-occurrence probability, and occurrence probability (Act 580). The documents retrieved are ranked according to the score (Act 584), and the documents may be provided to the user in rank order (Act 586).

Note that in the above-described acts, the sequence of calculations need not be performed in the order shown. For example, the substitution probability may be calculated after the calculation of the co-occurrence probability or calculation of the occurrence probability of the substitutable. In other words, Parts A, B, and C of Equation 5 may be calculated in any order to arrive at the score. Further, the substitutables may not necessarily be "calculated," and in some embodiments, may be obtained from an existing substitution table or other storage. Also note that document retrieval may be performed at any point before the score is calculated.

In other embodiments, the query need not necessarily be segmented into units, assuming that the query contains two or more search terms. Based only on the search terms or words in the query, the context-sensitive query expansion process may be applied to the query as described above. To apply the process without segmentation, one or more substitutable terms may be selected for each search term in the query. Equation 5 above is then applied to calculate the substitution probability, the co-occurrence probability, and the occurrence probability to determine a score.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A method for processing a search query having a plurality of search terms for searching for documents, the method comprising:
   segmenting the query to identify two or more units;
   expanding the query by selecting one or more substitutable units for at least one unit in the query;
   calculating a substitution probability for each substitutable unit;
   for each substitutable unit, calculating a co-occurrence probability with each of the remaining units in the search query;
   determining an occurrence probability for each substitutable unit;
   calculating a score based on the combination of the substitution probability, the co-occurrence probability, and occurrence probability; and
   ranking the documents in an order determined by the score.

2. The method of claim 1, wherein one or more substitutable units are selected from a table or storage of substitutable units, the table of substitutable units being periodically updated.

3. The method of claim 1, wherein a context of a selected unit is based upon all of the units in the segmented query other than the selected unit.

4. The method of claim 3, wherein a probability that a substitutable unit is relevant to its corresponding unit given the context of all of the units in the query, is calculated based on Bayes' rule.

5. The method of claim 1, wherein the substitution probability associated with a substitutable unit is based on an occurrence frequency of the substitutable unit relative to the corresponding unit in related documents.

6. The method of claim 1, wherein the co-occurrence probability associated with a substitutable unit is based on an occurrence frequency of the substitutable unit relative to all units in the query except the unit corresponding to the substitutable unit.

7. The method of claim 1, wherein the occurrence probability associated with a substitutable unit is based on an occurrence frequency of the substitutable unit relative all documents in a corpus.

8. The method of claim 1, wherein the score is calculated as the substitution probability multiplied by the co-occurrence probability multiplied by the occurrence probability.

9. The method of claim 1, wherein documents having a higher score are provided to a user in a list above documents having a lower score, and documents having a score lower than a predetermined value are not presented to the user.

10. The method of claim 1, wherein documents are retrieved from a corpus based on the segmented units and the substitutable units of the query using a likelihood-type document retrieval process.

11. The method of claim 1, wherein query is expanded using a term frequency inverse document frequency (TFIDF) process, a pseudo-relevance feedback process, or context-blind rewriting process.

12. A method for processing a search query having at least two search terms for searching for documents, the method comprising:
   expanding the query selecting one or more substitutable terms for at least one search term in the query;
   calculating a substitution probability for each substitutable term;
   for each substitutable term, calculating a co-occurrence probability with each of the remaining search terms in the search query;
   determining an occurrence probability for each substitutable term;
   calculating a score based on the combination of the substitution probability, the co-occurrence probability, and occurrence probability; and
   ranking the documents in an order determined by the score.

13. The method of claim 12, wherein one or more substitutable terms are selected from a table or storage of substitutable terms, the table of substitutable terms being periodically updated.

14. The method of claim 12, wherein a context of a selected term is based upon all of the terms in the query other than the selected term.

15. The method of claim 14, wherein a probability that a substitutable term is relevant to its corresponding term given the context of all of the terms in the query, is calculated based on Bayes' rule.

16. The method of claim 12, wherein the substitution probability associated with a substitutable term is based on an occurrence frequency of the substitutable term relative to the corresponding term in related documents.

17. The method of claim 12, wherein the co-occurrence probability associated with a substitutable term is based on an occurrence frequency of the substitutable term relative to all terms in the query except the term corresponding to the substitutable term.

18. The method of claim 12 wherein the occurrence probability associated with a substitutable term is based on an occurrence frequency of the substitutable term relative all documents in a corpus.

19. The method of claim 12, wherein the score is calculated as the substitution probability multiplied by the co-occurrence probability multiplied by the occurrence probability.

20. The method of claim 12, wherein documents having a higher score are provided to a user in a list above documents having a lower score, and documents having a score lower than a predetermined value are not presented to the user.

21. The method of claim 12, wherein documents are retrieved from a corpus based on the segmented terms and the substitutable terms of the query using a likelihood-type document retrieval process.

22. A computer-readable storage medium having processor executable instructions to process a search query having a plurality of search terms for searching for documents, by performing the acts of:
   segmenting the query to identify two or more units;
   expanding the query by selecting one or more substitutable units for at least one unit in the query;
   calculating a substitution probability for each substitutable unit;
   for each substitutable unit, calculating a co-occurrence probability with each of the remaining units in the search query;
   determining an occurrence probability for each substitutable unit;
   calculating a score based on the combination of the substitution probability, the co-occurrence probability, and occurrence probability; and
   ranking the documents in an order determined by the score.

23. The computer-readable storage medium of claim 22, further comprising processor executable instructions to cause a processor to perform the acts of calculating the substitution probability associated with a substitutable unit based on an occurrence frequency of the substitutable unit relative to the corresponding unit in related documents.

24. The computer-readable storage medium of claim 22, further comprising processor executable instructions to cause a processor to perform the acts of calculating the co-occurrence probability associated with a substitutable unit based on an occurrence frequency of the substitutable unit relative to all units in the query except the unit corresponding to the substitutable unit.

25. The computer-readable storage medium of claim 22, further comprising processor executable instructions to cause a processor to perform the acts of calculating the occurrence probability associated with a substitutable unit based on an occurrence frequency of the substitutable unit relative all documents in a corpus.

26. A system for processing a search query having a plurality of search terms for searching for documents, the system comprising:
- a search engine configured to receive the query and provide search results based on the query;
- a processor in communication with the search engine and configured to process the search query;
- the processor further configured to
    - segment the query to identify two or more units;
    - expand the query by selecting one or more substitutable units for at least one unit in the query;
    - calculate a substitution probability for each substitutable unit;
    - for each substitutable unit, calculate a co-occurrence probability with each of the remaining units in the search query;
    - determine an occurrence probability for each substitutable unit;
    - calculate a score based on the combination of the substitution probability, the co-occurrence probability, and occurrence probability; and
    - rank the retrieved documents in an order determined by the score.

27. The system of claim 26, wherein the processor calculates the substitution probability associated with a substitutable unit based on an occurrence frequency of the substitutable unit relative to the corresponding unit in related documents.

28. The system of claim 26, wherein the processor calculates the co-occurrence probability associated with a substitutable unit is based on an occurrence frequency of the substitutable unit relative to all units in the query except the unit corresponding to the substitutable unit.

29. The system of claim 26, wherein the processor calculates the occurrence probability associated with a substitutable unit is based on an occurrence frequency of the substitutable unit relative all documents in a corpus.

\* \* \* \* \*